(12) United States Patent
Molitorisz

(10) Patent No.: US 7,350,305 B2
(45) Date of Patent: Apr. 1, 2008

(54) LASER ACTIVATED AUDIBLE SIGNAL EMITTING LEVELER

(75) Inventor: Joseph Molitorisz, Renton, WA (US)

(73) Assignee: Molitech Corporation, Lake Stevens, WA (US)

( * ) Notice: Subject to any disclaimer, the term of this patent is extended or adjusted under 35 U.S.C. 154(b) by 0 days.

(21) Appl. No.: 11/357,843

(22) Filed: Feb. 21, 2006

(65) Prior Publication Data
US 2007/0193048 A1    Aug. 23, 2007

(51) Int. Cl.
G01C 9/24    (2006.01)

(52) U.S. Cl. ............ 33/366.16; 33/381; 340/689

(58) Field of Classification Search ............ 33/366.16, 33/366.11, 366.15, 366.23, 366.27, 347, 348, 33/353, 354, 365, 370, 371, 372, 374, 375, 33/377, 379, 381, 286, DIG. 21; 340/686.1, 340/689
See application file for complete search history.

(56) References Cited

U.S. PATENT DOCUMENTS

| | | | | |
|---|---|---|---|---|
| 2,607,882 A | * | 8/1952 | Arnold | 33/348.2 |
| 3,299,523 A | * | 1/1967 | Lea | 33/366.21 |
| 3,861,052 A | * | 1/1975 | Siegfried | 33/366.26 |
| 3,863,067 A | * | 1/1975 | Gooley | 33/366.16 |
| 4,182,046 A | * | 1/1980 | Ludlow et al. | 33/366.16 |
| 4,484,393 A | * | 11/1984 | LaFreniere | 33/348.2 |
| 4,574,491 A | * | 3/1986 | Vining | 33/366.21 |
| 4,590,680 A | * | 5/1986 | Hanchett et al. | 33/366.16 |
| 4,625,423 A | * | 12/1986 | Sackett | 33/366.16 |
| 4,755,801 A | * | 7/1988 | Gooley | 340/566 |
| RE32,962 E | * | 6/1989 | Tudek | 33/366.12 |
| 4,956,922 A | * | 9/1990 | Bodewes | 33/366.16 |
| 5,101,570 A | * | 4/1992 | Shimura | 33/366.16 |
| 5,218,771 A | * | 6/1993 | Redford | 33/366.12 |
| 5,761,818 A | * | 6/1998 | Hopkins et al. | 33/366.14 |
| 5,815,937 A | * | 10/1998 | Glorioso, Jr. | 33/370 |
| 5,953,116 A | * | 9/1999 | Ohtomo et al. | 356/249 |
| 6,058,617 A | * | 5/2000 | Nadu | 33/366.12 |
| 6,647,634 B2 | * | 11/2003 | Yang et al. | 33/390 |
| 6,836,972 B2 | * | 1/2005 | Drahos et al. | 33/366.11 |
| 2002/0162235 A1 | * | 11/2002 | Rando | 33/366.16 |
| 2003/0005592 A1 | * | 1/2003 | Wang | 33/451 |
| 2003/0150122 A1 | * | 8/2003 | Brinton | 33/348 |

FOREIGN PATENT DOCUMENTS

GB    2238382 A  *  5/1991

* cited by examiner

Primary Examiner—G. Bradley Bennett
Assistant Examiner—Amy R. Cohen
(74) Attorney, Agent, or Firm—Graybeal Jackson Haley LLP

(57) ABSTRACT

This invention pertains to the leveling device applying the optical interaction between a laser beam and a freely floating air bubble confined in a transparent, liquid-filled vial. When the air bubble is impacted by the laser beam, the curved surface of the air-bubble deflects the beam toward the end of the vial, where a photo-electric device is positioned. The photo-electric device activates a sound emitter such as a buzzer. The function of the level being based on the optical interaction between a laser beam and the curvature of an air-bubble, it is highly accurate and consistent. It is applicable for vertical and horizontal settings, has an adjustable arm for secure attachment to structural frames or other objects. No direct eye and manual contact with the device is needed while in operation.

4 Claims, 1 Drawing Sheet

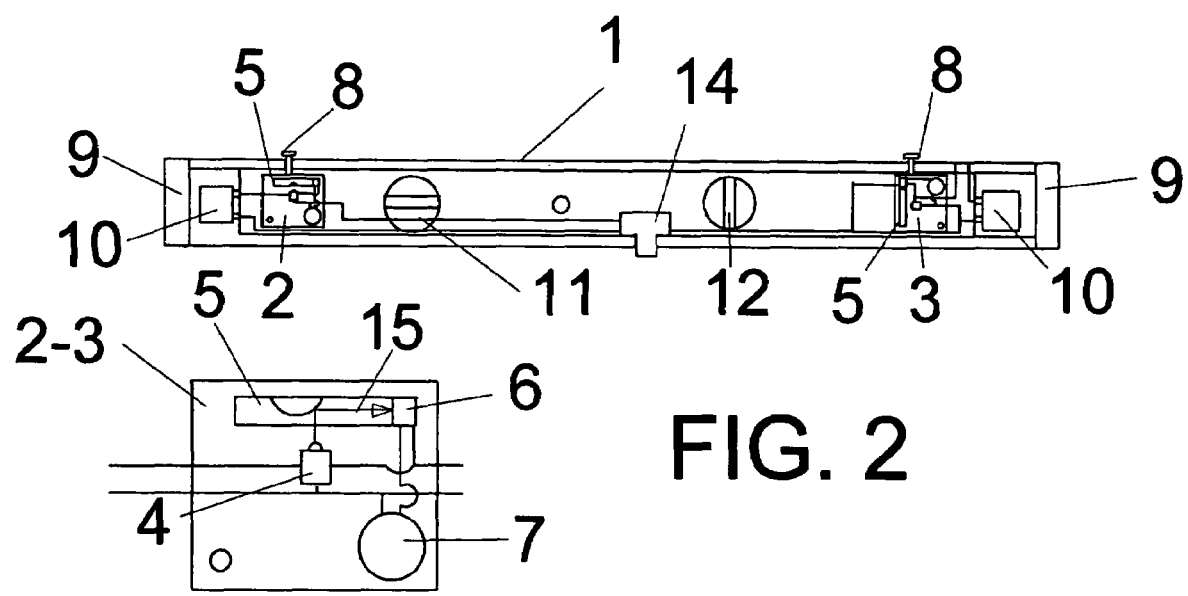
FIG. 1
FIG. 2
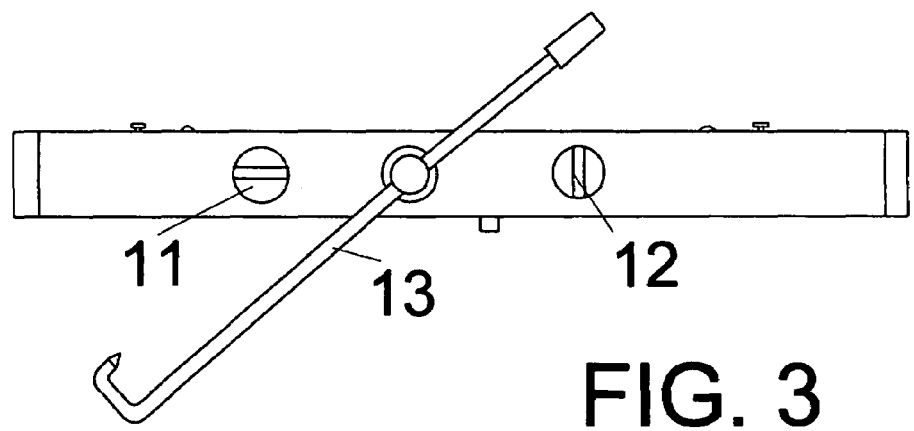
FIG. 3 ical or horizontal position. Further, the device is equipped with an adjustable attachment arm for secure attachment to frames or other structural elements during their erection and setting up. The principle and useful features of the invention are; (a) freeing the operator from the otherwise necessary eye contact with the leveling device, (b) freeing the hands from holding the device against the structural frame or wall while setting them up.

LASER ACTIVATED AUDIBLE SIGNAL EMITTING LEVELER

FIELD OF THE INVENTION

This invention relates to a portable leveling device incorporating laser beam emitter(s), liquid-filled transparent tubular vial(s) containing a freely floating air-bubble, sound generator(s) to produce audible signal when the device is in exact vertical or horizontal position. Further, the device is equipped with an adjustable attachment arm for secure attachment to frames or other structural elements during their erection and setting up. The principle and useful features of the invention are; (a) freeing the operator from the otherwise necessary eye contact with the leveling device, (b) freeing the hands from holding the device against the structural frame or wall while setting them up.

DESCRIPTION OF PRIOR ART

The accuracy, reliability and simplicity of the conventional air-bubble type levelers are recognized in the construction industry. In their use the levelers are laid on flat horizontal surfaces, or are hand-held against upright frames and walls. Their angular position is being indicated by the location of an air-bubble in a vial, therefore, direct eye contact with the devices is necessary. Leveling devices having liquid-filled glass vials as level indicators and laser beam emitters to project straight lines or reference marking points have been in use for several years. However, in such devices there is no direct functional interaction between the vials and the laser beam emitters.

SUMMARY OF THE INVENTION

The primary object of this invention is easing the work in setting up structures, structural frames of other objects, specifically eliminating the need for eye contact with the leveling device, and freeing the hands. These aims are achieved with the integration of; (a) a conventional liquid filled tubular vial containing a freely floating air-bubble, (b) laser beam emitter, (c) electric eye, (d) sound generator. With an audible signal the operator can concentrate on setting up structural frames or walls without eye contact with the leveling device. It also enables the operator to work under dim lighting conditions. By securing the device to the frame or wall with the adjustable attachment arm, both hands remain free. With the immediate and accurate response of the leveling device, checking already set up frames or walls can also be done quickly and easily.

The functional principle of the invention is based on the optical interaction between a laser beam and a freely floating air-bubble in a liquid-filled transparent tubular vial. The laser beam is directed externally and perpendicular to the longitudinal axis of the vial at its mid-section. When the air-bubble is at the impact point of the laser beam, its concave configuration deflects a portion of the impacting laser beam, some toward the ends of the tubular vial. The deflected light is sensed by an electric eye mounted at one end of the vial. However, the electric eye can also be mounted at other locations where the deflected laser beam impacts. When impacted by a portion of the deflected beam the electric eye closes the circuit between a power source, such as battery, and a sound generator, activating it to emit an audible signal.

The deflection of the laser beam being an optical function of the curvature of the freely-floating air-bubble, it occurs consistently and exactly at the same position of the air-bubble, thereby assuring exact signaling of the horizontal or vertical positions of the leveling device. When the air-bubble is not at the laser beam's impact point, the deflection of the laser beam occurs in a straight line projection perpendicular to the longitudinal axis of the vial.

The functional principles of the invented leveling device can be applied to horizontal, vertical, as well as to any other angular settings. For convenience the conventional air-bubble vials as references are also included in the device. Through its novel functional principle the leveling device can provide high degree of accuracy, durability, portability and affordability. Not having moving parts, wear and mechanical malfunction are excluded.

BRIEF DESCRIPTION OF THE DRAWINGS

FIG. 1. Cross-sectional side view of the device.
FIG. 2. Side view of the assembly blocks
FIG. 3. Side view of the device with the attachment arm.

DETAILED DESCRIPTION OF THE PREFERRED EMBODIMENT

The device shown on FIG. 1 comprises a rectangular tubular housing (1). It contains two pivotally and adjustably mounted assembly blocks (2) (3), each block incorporating a laser beam emitter (4), a liquid-filled tubular vial containing a freely floating air-bubble (5), an electric eye (6), and a sound generator (7). In the illustration the electric eyes (6) are mounted at the ends of the vials (5). It is, however, understood that they can be mounted at other locations within the blocks where the deflected laser beam impacts. One of the assembly blocks (2) is mounted having the longitudinal axis of the vial approximately parallel to the longitudinal axis of the tubular housing (1). This block is to signal the horizontality of the leveling device. The other assembly block (3) is mounted such that the longitudinal axis of the vial is perpendicular to the longitudinal axis of the tubular housing (1). This assembly block is to signal the verticality of the leveling device. Fine adjustment screws (8) are included to tune the assembly blocks (2) (3) for exact parallel and vertical positions relative to the longitudinal axis of the rectangular tubular housing (1). Two end caps (9) are inserted in the housing for holding batteries (10) supplying power for both assembly blocks. Two conventional air-bubble vial assemblies (11) (12) are mounted on the tubular housing, one for horizontal and one for vertical settings. These vial assemblies are intended as reference items, and functionally are not parts of the laser beam activated components.

The adjustable attachment arm (13) shown on FIG. 2, is pivotally mounted at or near the mid section of the tubular housing, and is extendible for the installation of the leveler on frames or other objects with varying dimensions. It is spring-loaded by a torsion spring (14) urging it toward the tubular housing, thereby exerting a clamping force to hold the leveler firmly. The power switch (15) closes and opens the circuit between the batteries (10) and the assembly blocks (2) (3). The light emitting diode (16) is activated when the electric circuits of the laser beam emitter and the sound generator are powered.

It is to be understood, that although the functional principles and the preferred embodiment of the invention have been set forth in the foregoing description, together with details of the structure and function of the device, the disclosure is illustrative only, and changes may be made without departing from the novel principles of the invention, and such changes still fall within the scope of the invention.

I claim:

1. A leveling device comprising:
   a freely floating air-bubble confined in a liquid-filled transparent tubular vial having an end, a mid-section and a longitudinal axis;
   a laser beam emitter operable to generate a laser beam directed substantially perpendicular to the longitudinal axis of said tubular vial at or near its mid-section;
   a power source, a sound emitter, a photo-electric device disposed at the end of the vial, and an electric circuit coupling each to each other such that when the photo-electric device receives light from the laser beam, the circuit closes causing the sound emitter to generate an audible signal from power received from the power source; and
   wherein when said air-bubble is at the impact point of said laser beam, the bubble's curved surface deflects the laser beam toward the photo-electric device.

2. The leveling device of claim 1 further comprising:
   a longitudinally extending tubular casing that contains:
      the power source, wherein the power source includes a battery,
      the electric circuit, wherein the circuit includes an electric switch that closes when the leveling device is in direct contact with an object, and wherein the circuit is closed when both the switch is closed and the photo-electric device receives light from the laser beam, and
      two assembly blocks, each adjustably mounted to the casing and each comprising a laser beam emitter, a freely floating air bubble confined in a transparent tubular vial filled with liquid, a photo-electric device, and a sound emitter.

3. The leveling device of claim 2 wherein:
   One of said adjustably mounted assembly blocks is installed in said tubular casing having the longitudinal axis of said transparent tubular vial substantially parallel to the longitudinal axis of said tubular casing to signal the horizontality of said leveling device,
   the other of said adjustably mounted assembly blocks is installed in said tubular casing having the longitudinal axis of said transparent tubular vial substantially perpendicular to the longitudinal axis of said tubular casing to signal the verticality of said leveling device, and
   said assembly blocks having fine adjustment means for the exact angular positioning of the transparent vials relative to the longitudinal axis of said tubular casing.

4. The leveling device of claim 1, further comprising an adjustable attachment arm for holding the leveling device securely to structural frames or other objects.

* * * * *